(12) United States Patent
Mansur et al.

(10) Patent No.: US 8,171,005 B2
(45) Date of Patent: May 1, 2012

(54) DATABASE QUIESCE OPERATIONS

(75) Inventors: Bruce Mansur, Dripping Springs, TX (US); Gary Salazar, Houston, TX (US)

(73) Assignee: BMC Software, Inc., Houston, TX (US)

( * ) Notice: Subject to any disclaimer, the term of this patent is extended or adjusted under 35 U.S.C. 154(b) by 308 days.

(21) Appl. No.: 12/550,083

(22) Filed: Aug. 28, 2009

(65) Prior Publication Data
US 2011/0055181 A1 Mar. 3, 2011

(51) Int. Cl.
*G06F 17/30* (2006.01)
(52) U.S. Cl. .................................. 707/703; 707/204
(58) Field of Classification Search .............. 707/10, 707/4, 204, 639, 999, 610
See application file for complete search history.

(56) References Cited

U.S. PATENT DOCUMENTS

| | | | |
|---|---|---|---|
| 5,495,606 A * | 2/1996 | Borden et al. ................. | 1/1 |
| 5,890,165 A * | 3/1999 | Boudrie et al. ................ | 1/1 |
| 6,202,071 B1 * | 3/2001 | Keene .......................... | 1/1 |
| 6,453,325 B1 * | 9/2002 | Cabrera et al. ................ | 1/1 |
| 6,609,123 B1 * | 8/2003 | Cazemier et al. .............. | 1/1 |
| 6,957,221 B1 * | 10/2005 | Hart et al. ..................... | 1/1 |
| 7,051,052 B1 * | 5/2006 | Shapiro et al. ............. | 707/610 |
| 7,200,626 B1 * | 4/2007 | Hoang et al. ................. | 1/1 |
| 7,263,537 B1 * | 8/2007 | Lin et al. ................. | 707/639 |
| 7,590,688 B2 * | 9/2009 | Franke ...................... | 709/204 |
| 7,657,510 B2 * | 2/2010 | Silverbrook et al. .. | 707/999.003 |
| 2002/0169777 A1 * | 11/2002 | Balajel et al. ................ | 707/10 |
| 2006/0020459 A1 * | 1/2006 | Carter et al. ................ | 704/246 |

\* cited by examiner

*Primary Examiner* — James Trujillo
*Assistant Examiner* — Thong Vu

(57) ABSTRACT

A technique to quiesce a database without causing after-arriving access requests to abnormally terminate interrogates database management system control structures associated with the database. Specified modifications to these control structures can be made so that subsequent access requests to the database (i.e., during quiesce operations) are not abnormally terminated. Once quiesced, regular or special purpose maintenance or testing operations, the starting or stopping of log keeping operations or similar operations may be made to the database. Once these are complete, the database control structures may be updated again to permit pending/scheduled access requests to proceed.

17 Claims, 5 Drawing Sheets

DATABASE QUIESCE OPERATIONS

BACKGROUND

The invention relates generally to database and database management system operations. More specifically, the invention relates to moving a hierarchical database to a quiesce point without causing applications attempting to access the database during the quiesce operation to fail.

Referring to FIG. 1, illustrative computational system 100 comprises database 105 and a plurality of database management systems (DBMS) 110 and 115. Each DBMS is shown as providing an execution environment for a number of different applications (A1→A3 and AX→AZ). In general, database 105 may be used (i.e., accesses and/or updated) by any number of applications, each of which may execute within a different DBMS. Each DBMS may reside on, and execute from, a different physical computer system, each of which may be physically remote from one another.

During normal database operations, it is often useful or necessary to quiesce a database. For example, a utility application (e.g., application A1 in DBMS 110) may want to start or stop log keeping operations or initiate a backup operation against database 105. One of ordinary skill in the art will recognize that these, and similar operations, require forcing database 105 to a quiesce point. As used herein, a "quiesce point" is a point-in-time when there are no incomplete transactions in process against a database and when all database information has been "hardened" (i.e., committed to permanent storage). Accordingly, to "quiesce a database" means to force the database to a quiesce point.

Referring to FIG. 2, prior art quiesce operation 200 shows utility application 205 (e.g., application AX) quiescing database 105 through IMS DBMS 210. Quiesce operation 200 begins when utility 205 issues IMS STOP command 215 to DBMS 210 targeting database 105. In response, DBMS 210 immediately begins to abnormally terminate all access requests issued against database 105 from other applications, 220. As used herein, "to abnormally terminate an access operation" means the request is caused to fail. (In an IMS environment, an abnormal termination is effected by an ABEND action.) As a consequence, all applications issuing such requests are unable to perform the requested task. If database 105 represents a bank's account database for example, and a user/customer attempts to access their account information in database 105 via an ATM after DBMS 210 receives utility 205's STOP command 215, the request will simply fail. As a consequence, the user/customer must either come back at a later time and try again or enter the bank to perform their desired task. In either situation, the bank has likely lost business.

Once new access operations to database 105 are stopped, DBMS 210 waits for all in-flight transactions against database 105 to complete (225) and then closes (230) and deallocates (235) database 105. As part of deallocation operation 235, database 105 has any working memory resident data hardened or written to permanent storage (e.g., one or more direct access storage devices). In many environments, database management systems do not provide a positive acknowledgement that a commanded task has completed. It is common, therefore, for requesting utility 205 to periodically query DBMS 210 to determine when prior issued STOP command 215 has completed (240). After deallocation process 235 has completed, and in response to such a query, DONE message 245 may be transmitted by DBMS 210 to utility 205. Requesting utility 205 may now perform (or have performed) the task for which STOP command 215 was issued (250). For example, utility 205 may start or stop logging operations against database 105. Once task 250 is complete, utility 205 may issue IMS START command 255 to DBMS 210 targeting database 105. In response, DBMS 210 allocates (260) and opens (265) database 105. Following completion of OPEN command 265, DBMS 210 permits access to database 105 (270). As before, utility 205 may periodically query DBMS 210 to determine when START operation 255 has completed (275), DBMS 210 issuing DONE message 280 when appropriate.

As illustrated, prior art quiesce technique 200 causes periods of database outage—times during which applications attempting to access the database being quiesced fail. For a business, each such failure can lead to the direct loss of business. Thus, it would be beneficial to provide a means to quiesce a database without causing applications attempting to access the database to fail.

SUMMARY

In one embodiment the invention provides a method to quiesce a database. The method includes identifying a target database and modifying one or more control parameters associated with the target database—the modification causing after-arriving access requests for the target database to be scheduled for execution at a later time rather than being abnormally terminated. After in-flight transactions pending against the target database are permitted to complete, any action against the target database may be safely taken. Illustrative actions include, but are not limited to, regular or special purpose maintenance or testing operations and the starting or stopping of log keeping operations. Once these actions are complete, the target database's data in buffer memory may be written to permanent storage and, thereafter, made available for continued access. That is, scheduled and newly arriving access requests are permitted to execute against the target database.

In another embodiment, the invention provides a plurality of computer systems communicatively coupled via a network where, cooperatively, the computer systems perform the acts outlined above. In still another embodiment, a computer executable program to implement the above-outlined method may be stored in any media that is readable and executable by a programmable control device (e.g., a computer processor).

DETAILED DESCRIPTION

In general, the invention relates to database management operations. More particularly, the invention relates to database quiesce operations in which applications attempting to access the database during the quiesce operation do not fail.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the database management and utility design field having the benefit of this disclosure. Accordingly, the claims appended hereto are not intended to be limited by the disclosed embodiments, but are to be accorded their widest scope consistent with the principles and features disclosed herein.

For illustrative purposes only, a quiesce operation in accordance with the invention will be described in the context of a hierarchical database environment. One widely known hierarchical database is the Information Management System (IMS) database from the International Business Machines (IBM) corporation. It will be recognized that IMS database systems typically operate in a mainframe computer system environment. As a consequence, IMS databases are typically part of an enterprise computing system.

Figure 1:
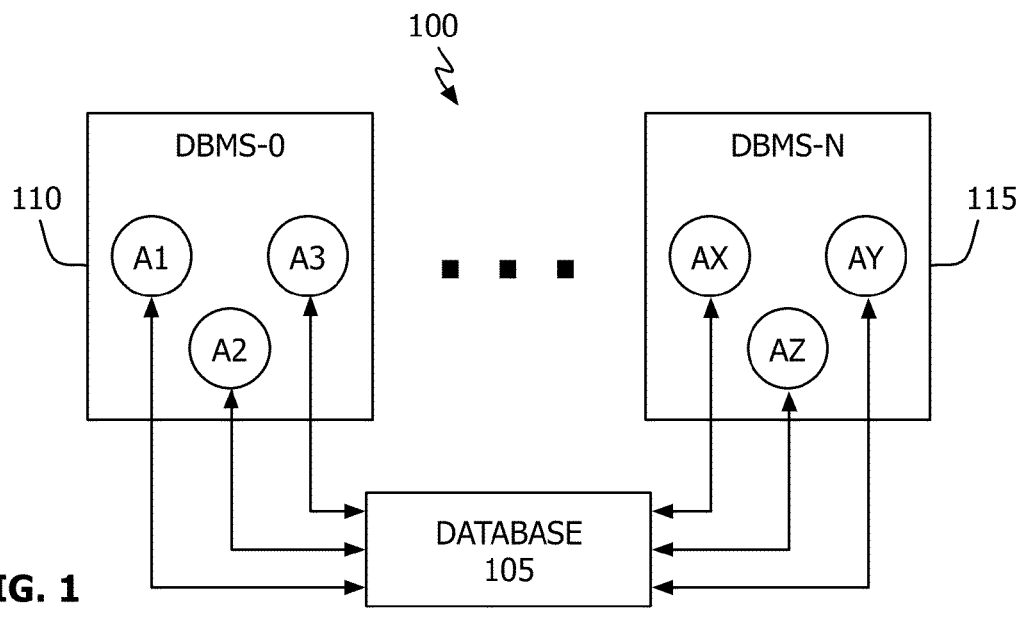
FIG. 1 shows, in block diagram form, an illustrative database management environment.
Figure 3:
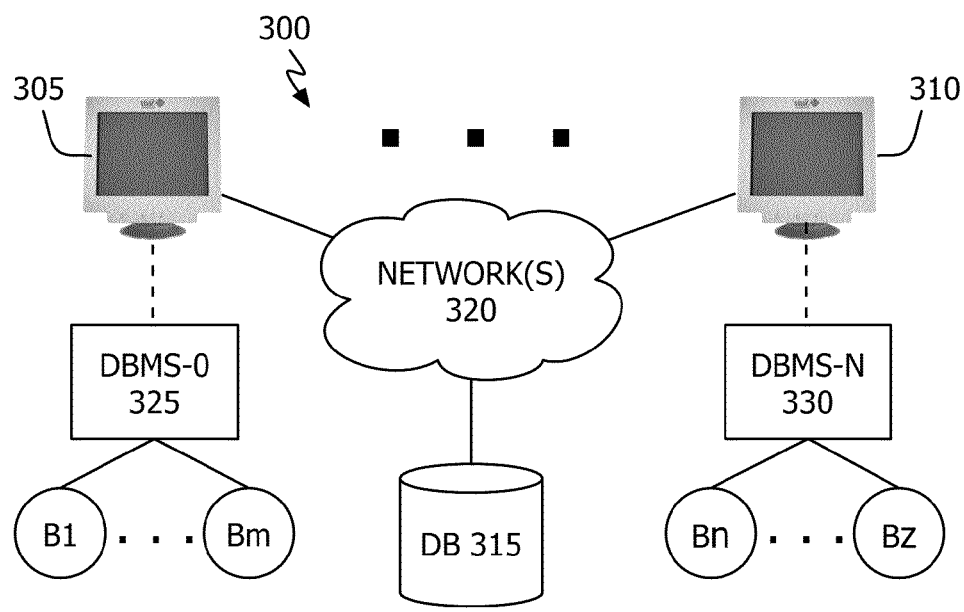
FIG. 3 shows, in block diagram form, an illustrative enterprise computing environment.

Referring to FIG. 3, illustrative enterprise computing system 300 comprises mainframe computer systems 305 and 310 and database 315 coupled through network 320. As shown, each of computer systems 305 and 310 provide an environment within which an IMS DBMS may execute (e.g., 325 and 330). Also shown are DBMS applications B1→Bm and Bn→Bz. For simplicity, only 2 computer systems are illustrated in enterprise 300. One of ordinary skill in the art will recognize that enterprise 300 may comprise hundreds or thousands of computer systems including mainframe computers (e.g., 305 and 310), desktop computer systems, client-server computer systems and the like. In enterprise computing environments such as that shown in FIG. 3, it is not uncommon for database 315 to receive thousands of transaction requests each second.

It will be recognized that DBMS systems are released with a given set of capabilities (i.e., commands that they recognize and can process). It is possible to extend the capabilities of an existing DBMS through a command processor. As used herein, a "command processor" is an entity that accepts commands unknown to an existing DBMS, and implements the command through a series of operations and/or commands to an existing DBMS that it can understand. Command processors may be implemented in software (i.e., as a sequence of computer executable instructions) or a combination of software and hardware.

Figure 4:
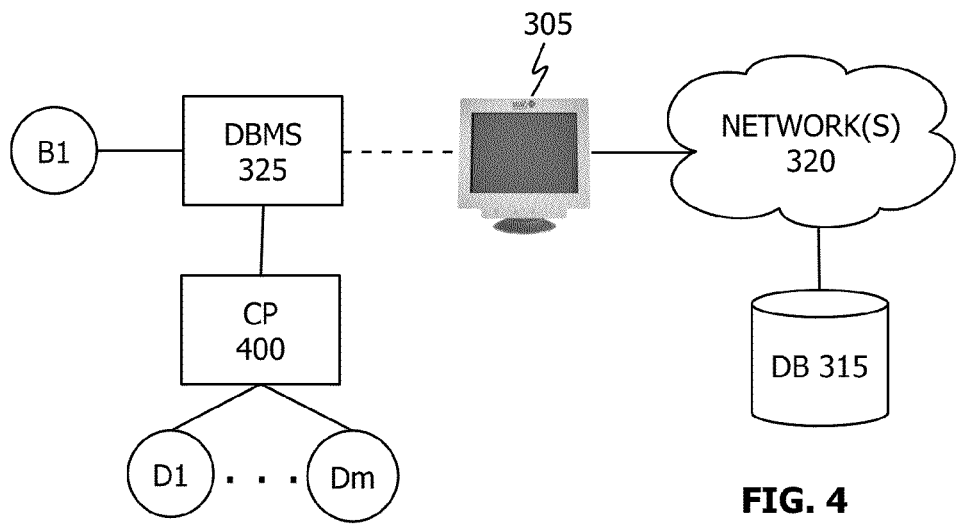
FIG. 4 shows, in block diagram form, a command processor in accordance with one embodiment of the invention.

Referring to FIG. 4, example command processor 400 accepts commands from one or more applications (e.g., D1→Dm) that DBMS 325 does not know and cannot directly process. Command processor 400 performs the requested task by issuing a series of operations and/or commands to DBMS 325 that it can understand. It will be understood that if an application (e.g., D1→Dm) issues a command to command processor 400 that DBMS 325 can directly process, command processor 400 can simply pass the command to DBMS 325. It will also be understood that applications executing on other computer systems may also access database 315 through command processor 400 (via network 320).

Figure 5:
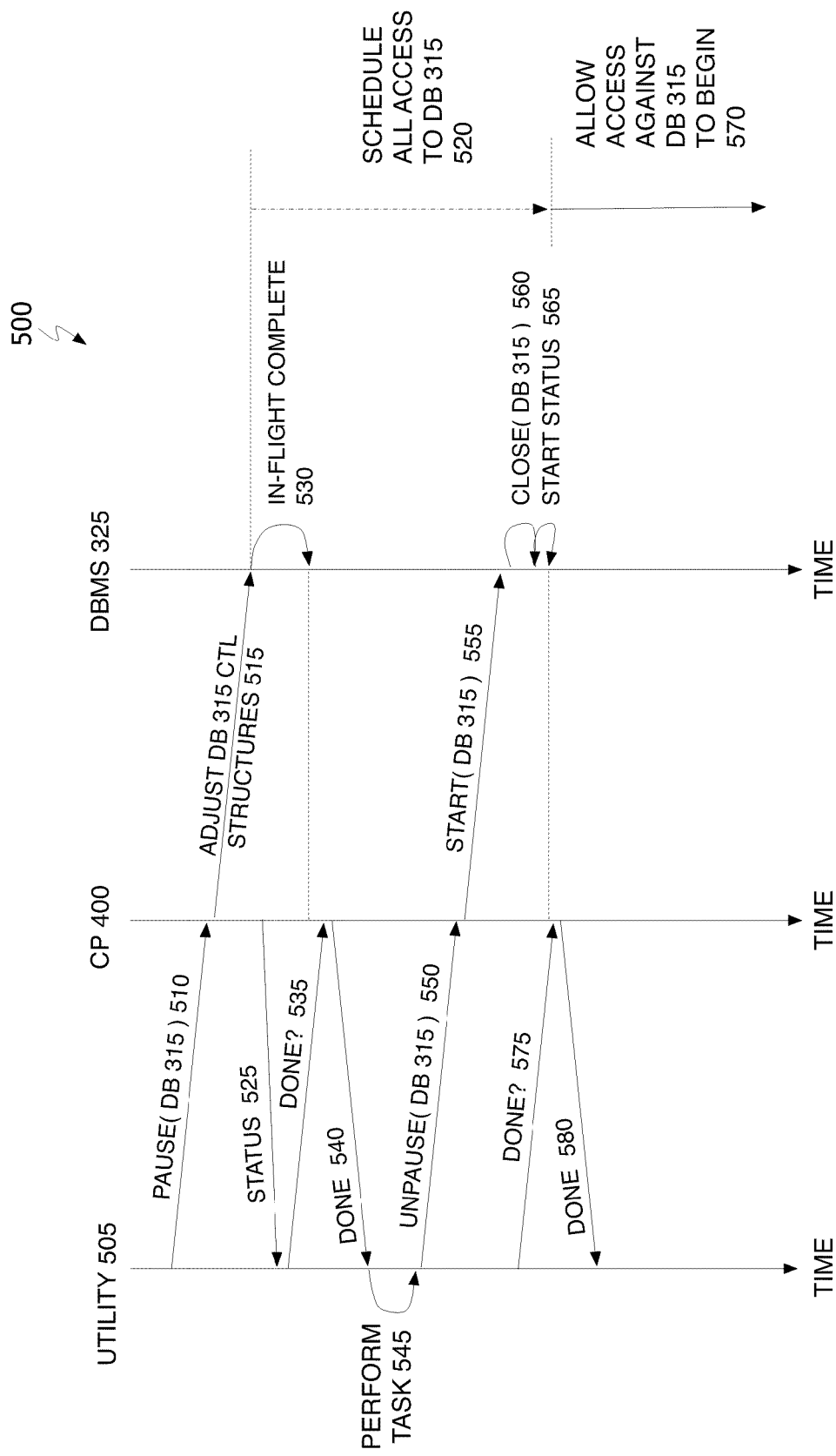
FIG. 5 shows an illustrative database quiesce operation in accordance with one embodiment of the invention.

Referring to FIG. 5, quiesce operation 500 in accordance with one embodiment of the invention begins when utility application 505 (e.g., application D1 in FIG. 4) issues PAUSE command 510, targeting database 315, to command processor 400. In response, command processor 400 interrogates DBMS 325 to determine which of its control structures are associated with database 315 and modifies them (515) so that any subsequent access operations against database 315 are scheduled by DBMS 325 (520). As used herein, the term "scheduled" means that an access request (i.e., a read or update operation) is postponed for completion in the future and not terminated abnormally. Accordingly, applications trying to access database 315 after acts in accordance with 515 do not fail.

On completion of modifying database 315's control structures in DBMS 325, command processor 400 issues STATUS message 525 to notify utility 505 whether there are any in-flight transactions against database 315. If there are transactions pending against database 315, command processor waits for them to complete (530). In one embodiment, utility 505 may periodically query command processor 400 to determine when in-flight transactions have completed (535). Similarly, command processor 400 may periodically interrogate DBMS 325 to determine if DBMS 315's in-flight transactions have completed (not shown). In another embodiment, utility 505 may wait a designated period of time before proceeding with quiesce operation 500. In still another embodiment, DBMS 325 may be configured to sua sponte provide notification when in-flight transactions have completed. However obtained, command processor 400 notifies utility 505 when all in-flight transactions have completed (540). (It is noted, if no in-flight transactions are identified following acts in accordance with operation 515, status message 525 may so indicate and operations 535 and 540 may be omitted.)

Once there are no outstanding transactions against database 315, utility 505 may perform whatever task(s) motivated the quiesce (545). The types of tasks that may be performed include, but are not limited to, regular or special purpose maintenance or testing operations and the starting or stopping of log keeping operations. When task 545 has completed, utility 505 may issue UNPAUSE command 550. On receipt of same, command processor 400 issues IMS START command 555 to DBMS 325 which, in turn, issues IMS CLOSE command 560 followed by IMS START command 565. One of ordinary skill in the art will recognize that one consequence of executing an IMS CLOSE command is that the targeted database's associated memory buffers are flushed. Thus, when DBMS 325 issues CLOSE command 560, data in working memory for database 315 is written to permanent storage, i.e., "hardened." Once closed, database 315 may be immediately reopened and, once this is done, all those access operations pending on database 315 may begin executing (570). Similar to operations 535 and 540, utility 505 may query command processor 400 to determine when the submitted UNPAUSE command has completed (575 and 580).

Figure 6:
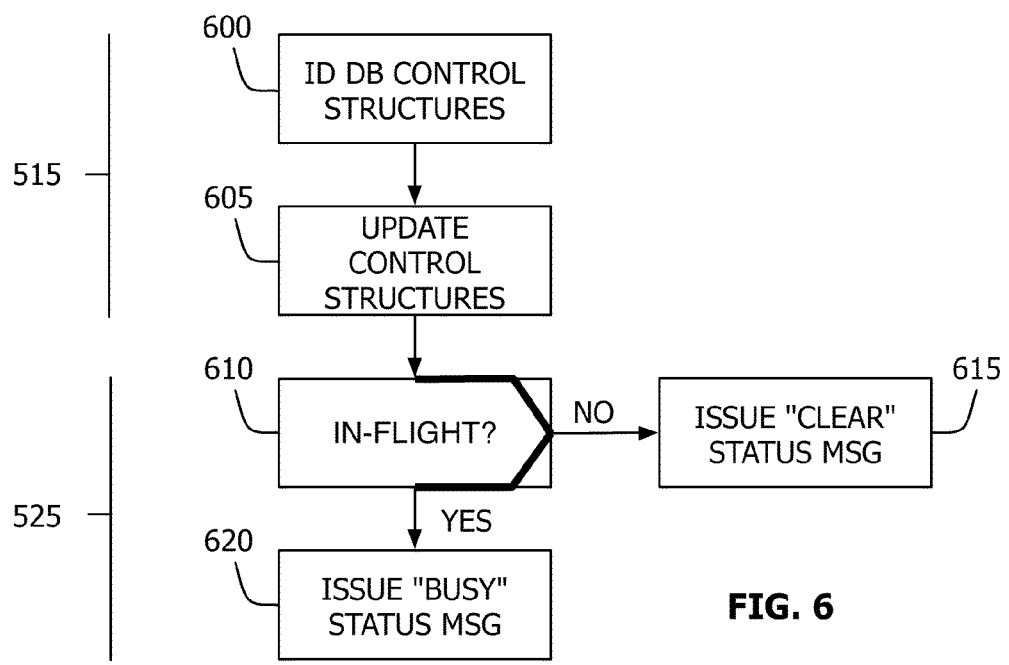
FIG. 6 shows, in flowchart form, command processor operations in accordance with one embodiment of the invention.

With respect to FIG. 5, PAUSE and UNPAUSE commands 510 and 550 are not supported directly by IMS DBMS 325. As a consequence, command processor 400 takes the necessary actions to effect their intended function. Referring to FIG. 6, operations to adjust database 315 control structures in accordance with 515 begin by interrogating DBMS 325's control region to identify all DDIR control blocks associated with target database 315 (block 600). It will be recognized that IMS DDIR control blocks describe certain physical characteristics of the associated database, e.g., database 315.

Once identified, those DDIR control block associated with target database 315 may be modified so as to cause DBMS 325 to schedule access requests targeting database 315 (block 605). Through the novel and in-depth investigation and testing of IMS DDIR structures, it has been determined that a specific bit may be manipulated in such a way to cause DBMS 325 to schedule received access requests rather than terminating them (i.e., issuing an ABEND). In the IMS database sold by IBM, this feature may be effected by setting bit DDIRSTSC in byte field DDIRCOD3 of a DDIR control block.

Once DDIR control blocks associated with target database 315 have been so modified, a further check of DBMS control blocks may be made to determine if there are any in-flight transactions against database 315 (block 610). If there are no open, pending or in-flight transactions (the "NO" prong of block 610), command processor 400 issues "CLEAR" status message 525 to utility application 505 indicating there are no pending transactions for database 315 (block 615). If there are pending or in-flight transactions (the "YES" prong of block 610), command processor 400 issues "BUSY" status message 525 to utility application 505 indicating there are pending transactions against database 315 (block 620).

Figure 7:
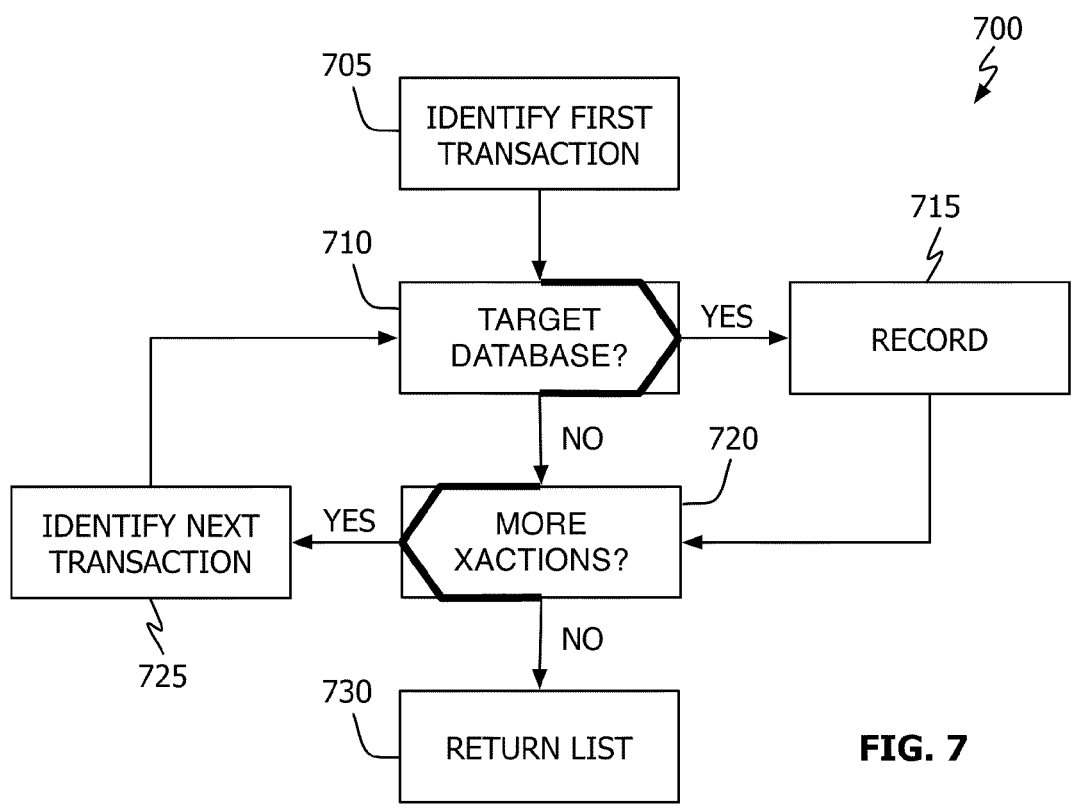
FIG. 7 shows, in flowchart form, an in-flight transaction detection operation in accordance with one embodiment of the invention.

Referring to FIG. 7, in-flight transaction detection operation 700 in accordance with one embodiment of the invention begins when a first in-flight transaction associated with DBMS 325 is identified (block 705). In an IMS environment, DBMS 325 maintains a PST control block for every transaction active within DBMS 325. From the PST control block, the specific database targeted by the transaction represented by the PST may be identified (block 710). If the identified database is the target database, that is, database 315 (the "YES" prong of block 710), a record of the PST is retained (block 715). If the identified database is not the target database (the "NO" prong of block 710) or after the acts of block 715, a check is made to determine if there are additional transactions (e.g., PST control blocks) to be reviewed (block 720). If there are transactions (e.g., PST control blocks) that have yet to be reviewed (the "YES" prong of block 720), the next transaction (e.g., PST control block) is obtained from DBMS 325 (block 725) whereafter operations continue at block 710. If all of DBMS 325's transactions have been reviewed (the "NO" prong of block 720), the list built up in accordance with block 715 is passed back to command processor 400 (block 730). It will be recognized that the list returned in accordance with block 730 may be a NULL list—such a list indicating there are no in-flight transactions for target database 315.

Operations in accordance with FIG. 7 may be repeated each time utility application 505 queries command processor 400 in accordance with 535 (e.g., via status query 535). When command processor 400 returns a NULL list in response to such a query, utility 505 knows that there are no in-flight transactions against database 325. Accordingly, operations in accordance with quiesce operation 500 may continue at 545.

With respect to UNPAUSE command 550, in one embodiment command processor 400 issues a database start command against database 315. In an IMS DBMS, for example, the START command automatically generates CLOSE command 560 which causes all buffers associated with database 315 to be flushed and the data hardened. Once closed, START command 555 places database 315 in a START STATUS 565—a consequence of which is that the data structures and control mechanisms adjusted during acts in accordance with 515 are cleared. In the current example, when database 315 is placed into a START STATUS, the DDIRSTSC bit in the DDIRCOD3 byte field is automatically cleared. In other embodiments, however, it may be necessary for command processor 400 to reset that mechanism invoked in accordance with 515. As a result of the DDIRSTSC bit being cleared, pending/scheduled access requests are permitted to run. Once in START STATUS, command processor 400 will respond to status inquiry (575) during acts in accordance with 580 in a manner similar to that described in accordance with 535 and 540. In an IMS database environment, it will be understood that a database in the START STATUS will be opened (i.e., have its data sets opened and made available) once it receives a first access request against the target database.

It will be recognized by those one of ordinary skill in the art that while the database quiesce operation described herein was directed toward an IMS database, it is equally applicable to other databases that use DBMS management data structures to track and control access to individually open databases. It will be understood that the particulars of operations in accordance with FIGS. 5, 6 and 7 may change from database to database, but that the principal of altering a database management structure to force incoming access requests to be scheduled rather than terminated may be equally applicable to other databases. For example, in different embodiments more than one control parameter may need to be modified to effect scheduling of after-arriving access requests. similarly, if the DBMS CLOSE command does not reset, clear or undo the control structure modifications put in place in accordance with FIG. 6, such modifications would need to be reset or cleared before scheduled access requests could proceed.

Figure 2:
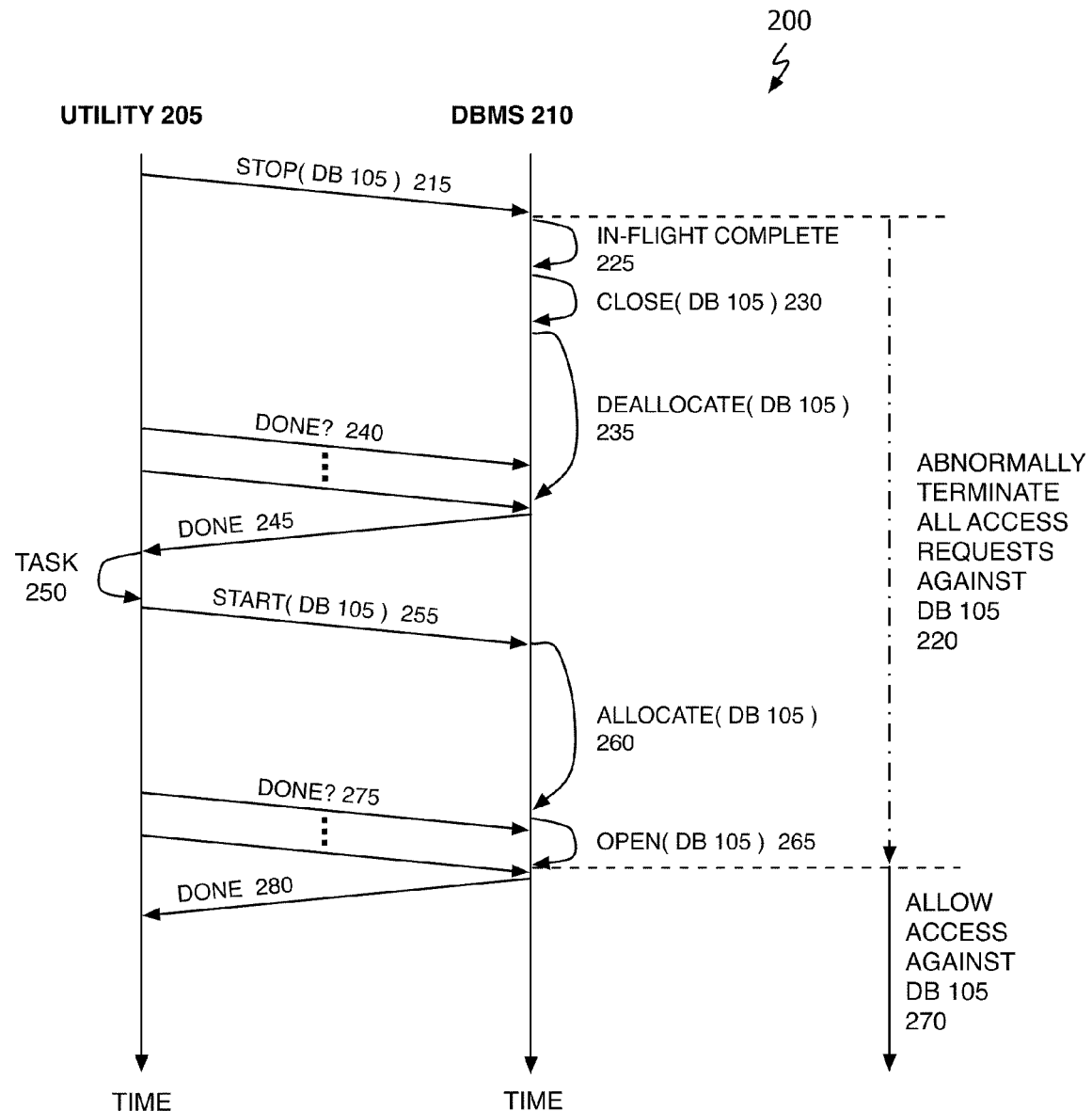
FIG. 2 shows an illustrative prior art database quiesce operation.

Comparison of FIGS. 2 and 5 shows that a quiesce operation in accordance with this disclosure eliminates the abnormal termination of access requests to a database during quiesce operations, and eliminates the need to deallocate and then allocate the target database, thereby significantly reducing the time and processor use burden of performing a quiesce operation. The fact that abnormal terminations may be eliminated in accordance with the disclosed quiesce operation can result in significantly improved application performance. Further, as each terminated access request can represent lost revenue for a business, with hundreds to thousands of access requests targeting any given database per second, use of the disclosed quiesce operation has the potential to save businesses significant amounts of money.

Various changes in the materials and components as well as in the details of the illustrated operational methods are possible without departing from the scope of the following claims. For instance, in the illustrative operation of FIG. 5, it may not be necessary for the command processor to independently determine in-flight transaction status—this may be done by the DBMS itself. In addition, utilization of a command processor may be avoided if the capabilities described herein were to be incorporated into the DBMS itself.

Finally, it will be recognized that acts in accordance with FIGS. 5-7 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A method including executing instructions recorded on a non-transitory computer-readable storage media using at least one processor, the method comprising:
   receiving a command to quiesce a target database;
   identifying the target database;
   modifying a control parameter for the target database at a first time in response to receiving the command;
   scheduling one or more access requests for the target database received after the first time to execute at a later time, wherein the modified control parameter causes the scheduling of the one or more access requests after receiving the command to quiesce the target database;
   allowing one or more in-flight transactions for the target database that are incomplete at the first time to complete, the time at which the one or more in-flight transactions complete being a second time;
   writing data for the target database to permanent storage at a third time, the third time being after the second time;
   modifying the control parameter for the target database at a fourth time; and
   executing the one or more scheduled access requests, wherein the modified control parameter causes the execution of the one or more scheduled access requests after the fourth time.

2. The method of claim 1, wherein the target database comprises a hierarchical database.

3. The method of claim 2, wherein the hierarchical database comprises an Information Management System (IMS) database.

4. The method of claim 3, wherein modifying the control parameter at a first time comprises modifying a specified byte field in a DDIR control block and modifying the control parameter at a fourth time comprises modifying the specified byte field in the DDIR control block.

5. The method of claim 4, wherein writing data for the target database to permanent storage comprises performing a database CLOSE operation against the target database.

6. The method of claim 5, wherein modifying the control parameter for the target database at a fourth time comprises placing the target database in an OPEN status.

7. The method of claim 1, wherein modifying the control parameter at a first time comprises modifying more than one control parameter for the target database and modifying the control parameter at a fourth time comprises modifying more than one control parameter for the target database.

8. The method of claim 1, further comprising performing a task against the target database after the third time and before the fourth time.

9. The method of claim 1, wherein allowing one or more in-flight transactions comprises:
   identifying one or more incomplete in-flight transactions for the target database; and
   subsequently periodically attempting to identify in-flight transactions for the target database, stopping when no incomplete in-flight transactions are identified.

10. A non-transitory computer-readable storage medium storing instructions that when executed cause a processor to perform a process, the instructions comprising instructions to:
    receive a command to quiesce a target database;
    identify the target database;
    modify a control parameter for the target database at a first time in response to receiving the command;
    schedule one or more access requests for the target database received after the first time to execute at a later time, wherein the modified control parameter causes the scheduling of the one or more access requests after receiving the command to quiesce the target database;
    allow one or more in-flight transactions for the target database that are incomplete at the first time to complete, the time at which the one or more in-flight transactions complete being a second time;
    write data for the target database to permanent storage at a third time, the third time being after the second time;
    modify the control parameter for the target database at a fourth time; and
    execute the one or more scheduled access requests, wherein the modified control parameter causes the execution of the one or more scheduled access requests after the fourth time.

11. The non-transitory computer-readable storage medium of claim 10, wherein the target database comprises a hierarchical database.

12. The non-transitory computer-readable storage medium of claim 11, wherein the hierarchical database comprises an Information Management System (IMS) database.

13. The non-transitory computer-readable storage medium of claim 12, wherein:
    the instructions to modify the control parameter at a first time comprise instructions to modify a specified byte field in a DDIR control block; and
    the instructions to modify the control parameter at a fourth time comprise instructions to modify the specified byte field in the DDIR control block.

14. A computer system, comprising:
    memory; and
    one or more programmable control devices, at least one of which is communicatively coupled to the memory, the memory having stored therein instructions for causing the one or more programmable control devices to:
    receive a command to quiesce a target database;
    identify the target database;
    modify a control parameter for the target database at a first time in response to receiving the command;
    schedule one or more access requests for the target database received after the first time to execute at a later time, wherein the modified control parameter causes the scheduling of the one or more access requests after receiving the command to quiesce the target database;
    allow one or more in-flight transactions for the target database that are incomplete at the first time to complete, the time at which the one or more in-flight transactions complete being a second time;
    write data for the target database to permanent storage at a third time, the third time being after the second time;
    modify the control parameter for the target database at a fourth time; and
    execute the one or more scheduled access requests, wherein the modified control parameter causes the execution of the one or more scheduled access requests after the fourth time.

15. The computer system of claim 14, wherein the target database comprises a hierarchical database.

16. The computer system of claim 15, wherein the hierarchical database comprises an Information Management System (IMS) database.

17. The computer system of claim 16, wherein:
    the instructions for causing the one or more programmable control devices to modify the control parameter at a first time comprise instructions for causing the one or more programmable control devices to modify a specified byte field in a DDIR control block; and the instructions for causing the one or more programmable control devices to modify the control parameter at a fourth time comprise instructions for causing the one or more programmable control devices to modify the specified byte field in the DDIR control block.

* * * * *